No. 750,548.

Patented January 26, 1904.

UNITED STATES PATENT OFFICE.

PHILIP F. LENHART, OF NEW YORK, N. Y., ASSIGNOR TO OLD COLONY CORK WOOD COMPANY, OF PORTLAND, MAINE, A CORPORATION OF MAINE.

CORKWOOD.

SPECIFICATION forming part of Letters Patent No. 750,548, dated January 26, 1904.

Application filed June 2, 1903. Serial No. 159,810. (No specimens.)

*To all whom it may concern:*

Be it known that I, PHILIP F. LENHART, a citizen of the United States of America, and a resident of the borough of Brooklyn, city of New York, county of Kings, and State of New York, have invented certain new and useful Improvements in Corkwood, of which the following is a specification.

This invention relates to corkwood; and its object is the production of a composition of matter thereof by the means described and claimed herein.

I combine the following ingredients in approximately the proportions stated—viz., chlorid of calcium, one-sixty-fourth pound; carbonate of soda, one-fourth pound; glue, two pounds; water, eight pounds; cork, twenty pounds.

The successive steps to produce the corkwood consist, first, in mixing in the following proportions, by weight: chlorid of calcium, one-sixty-fourth pound; carbonate of soda, one-fourth pound; glue, two pounds, and water, eight pounds, and heating the said mixture to dissolve the solid matter. The next step is to collect a dry layer of cork-shavings or small pieces of cork weighing ten pounds in a mold, which latter with its contents are placed on the table of a press, after which a similar layer of ten pounds of cork saturated with the above-specified solution is placed on top of the dry layer, and these steps are repeated, placing the layers of dry and saturated cork alternately on top of each other in the press. When a sufficient number have been collected, they are all subjected to pressure for from one to four hours, when there is formed a homogeneous consolidated mass of cork. The product is then taken to a second press and dried under pressure, preferably by blowing a current of air over the same for from four to five hours, producing what is commonly known as "corkwood," which is then ready to be cut into various shapes for use.

It is understood that the molds can be shaped to produce the corkwood in various shapes and sizes, which will not require any subsequent cutting or shaping.

I may modify the composition matter of my invention by adding to the ingredients specified one-sixty-fourth pound of glycerin, and the chlorid of calcium may be omitted with or without the use of the glycerin.

Having described my invention, I claim—

1. A composition of matter containing carbonate of soda, glue, water, and cork.

2. A composition of matter containing, chlorid of calcium, carbonate of soda, glue, water, and cork.

3. A corkwood consisting of chlorid of calcium, carbonate of soda, glycerin, glue, water, and cork.

4. A corkwood consisting proportionately by weight, of chlorid of calcium one-sixty-fourth, glycerin one-sixty-fourth, carbonate of soda one-fourth, glue two, water eight, and cork twenty.

Signed at New York, county and State of New York, this 25th day of April, 1903.

PHILIP F. LENHART.

Witnesses:
W. H. LAIRD,
SAMUEL BACHMAN.